United States Patent
Bunker (10) Patent No.: US 9,476,306 B2
(45) Date of Patent: Oct. 25, 2016

(54) COMPONENTS WITH MULTI-LAYERED COOLING FEATURES AND METHODS OF MANUFACTURE

(71) Applicant: General Electric Company, Schenectady, NY (US)

(72) Inventor: Ronald Scott Bunker, West Chester, OH (US)

(73) Assignee: General Electric Company, Niskayuna, NY (US)

(*) Notice: Subject to any disclaimer, the term of this patent is extended or adjusted under 35 U.S.C. 154(b) by 317 days.

(21) Appl. No.: 14/089,888

(22) Filed: Nov. 26, 2013

(65) Prior Publication Data

US 2015/0143792 A1 May 28, 2015

(51) Int. Cl.
F01D 5/18 (2006.01)

(52) U.S. Cl.
CPC ........... *F01D 5/187* (2013.01); *F05D 2230/31* (2013.01); *F05D 2230/90* (2013.01); *Y02T 50/672* (2013.01); *Y02T 50/676* (2013.01)

(58) Field of Classification Search
CPC .................. Y10T 29/49336; Y10T 29/49339; F01D 5/187; F05D 2230/90; F05D 2230/31
See application file for complete search history.

(56) References Cited

U.S. PATENT DOCUMENTS

| | | | |
|---|---|---|---|
| 4,376,004 A | 3/1983 | Bratton et al. | |
| 4,487,550 A * | 12/1984 | Horvath | F01D 5/20 416/92 |
| 4,893,987 A | 1/1990 | Lee et al. | |
| 5,223,320 A | 6/1993 | Richardson | |
| 5,564,902 A | 10/1996 | Tomita | |
| 5,626,462 A | 5/1997 | Jackson et al. | |
| 5,640,767 A | 6/1997 | Jackson et al. | |
| 5,660,523 A | 8/1997 | Lee | |
| 5,875,549 A | 3/1999 | McKinley | |
| 6,059,530 A | 5/2000 | Lee | |
| 6,086,328 A | 7/2000 | Lee | |
| 6,164,914 A | 12/2000 | Correia et al. | |
| 6,190,129 B1 | 2/2001 | Mayer et al. | |

(Continued)

FOREIGN PATENT DOCUMENTS

EP 1387040 B1 4/2004

OTHER PUBLICATIONS

Hyams et al., "A Detailed Analysis of film Cooling Physics: Part III—Streamwise Injection With Shaped Holes," Journal of Turbomachinery, vol. 122, Issue 1, Jan. 2000, pp. 122-132.

(Continued)

*Primary Examiner* — Richard Chang
(74) *Attorney, Agent, or Firm* — Ann M. Agosti (57) ABSTRACT

A manufacturing method includes providing a substrate having one or more grooves formed therein. One or more coatings having one or more grooves formed therein are disposed on the substrate and in fluid communication with the one or more grooves in the substrate. A cover coating is disposed on a portion of an outermost surface of the one or more coatings, having one or more cooling outlets formed therein and in fluid communication with the one or more grooves in the one or more coatings. The substrate, the one or more coatings and the cover coating define therein a cooling network for cooling a component. A component having a cooling network defined therein a substrate, one or more coatings disposed on at least a portion of the substrate, and a cover coating disposed over at least a portion of an outermost coating of the one or more coatings.

20 Claims, 6 Drawing Sheets

(56) References Cited

U.S. PATENT DOCUMENTS

| | | | |
|---|---|---|---|
| 6,214,248 B1 | 4/2001 | Browning et al. | |
| 6,231,307 B1 | 5/2001 | Correia | |
| 6,234,755 B1 | 5/2001 | Bunker et al. | |
| 6,321,449 B2 | 11/2001 | Zhao et al. | |
| 6,368,060 B1 | 4/2002 | Fehrenbach et al. | |
| 6,383,602 B1 | 5/2002 | Fric et al. | |
| 6,405,435 B1 | 6/2002 | Konter et al. | |
| 6,412,541 B2 | 7/2002 | Roesler et al. | |
| 6,427,327 B1 | 8/2002 | Bunker | |
| 6,461,107 B1 | 10/2002 | Lee et al. | |
| 6,461,108 B1 | 10/2002 | Lee et al. | |
| 6,494,678 B1 | 12/2002 | Bunker | |
| 6,551,061 B2 | 4/2003 | Darolia et al. | |
| 6,582,194 B1 | 6/2003 | Birkner et al. | |
| 6,602,052 B2 | 8/2003 | Liang | |
| 6,602,053 B2 | 8/2003 | Subramanian et al. | |
| 6,617,003 B1 | 9/2003 | Lee et al. | |
| 6,634,860 B2 | 10/2003 | Lee et al. | |
| 6,905,302 B2 * | 6/2005 | Lee | F01D 5/288 415/115 |
| 6,921,014 B2 | 7/2005 | Hasz et al. | |
| 6,994,514 B2 | 2/2006 | Soechting et al. | |
| 7,014,923 B2 | 3/2006 | Schnell et al. | |
| 7,094,475 B2 | 8/2006 | Schnell et al. | |
| 7,186,167 B2 | 3/2007 | Joslin | |
| 7,198,458 B2 | 4/2007 | Thompson | |
| 7,216,428 B2 | 5/2007 | Memmen et al. | |
| 7,302,990 B2 | 12/2007 | Bunker et al. | |
| 7,334,991 B2 | 2/2008 | Liang | |
| 7,744,348 B2 | 6/2010 | Bezencon et al. | |
| 7,766,617 B1 | 8/2010 | Liang | |
| 7,775,768 B2 | 8/2010 | Devore et al. | |
| 8,079,821 B2 | 12/2011 | Campbell et al. | |
| 8,096,766 B1 | 1/2012 | Downs | |
| 8,147,196 B2 | 4/2012 | Campbell et al. | |
| 8,210,815 B2 | 7/2012 | Bezencon et al. | |
| 8,317,476 B1 | 11/2012 | Liang | |
| 8,360,726 B1 | 1/2013 | Liang | |
| 8,387,245 B2 | 3/2013 | Bunker et al. | |
| 2007/0181278 A1 | 8/2007 | Bancheri et al. | |
| 2011/0070096 A1 | 3/2011 | Wei et al. | |
| 2011/0185572 A1 | 8/2011 | Wei et al. | |
| 2011/0259017 A1 | 10/2011 | Lacy et al. | |
| 2011/0293423 A1 | 12/2011 | Bunker et al. | |
| 2012/0114868 A1 | 5/2012 | Bunker et al. | |
| 2012/0114912 A1 | 5/2012 | Bunker et al. | |
| 2012/0124832 A1 | 5/2012 | Bunker et al. | |
| 2012/0145371 A1 | 6/2012 | Bunker et al. | |
| 2012/0163984 A1 * | 6/2012 | Bunker | F01D 5/187 416/241 B |
| 2012/0207953 A1 | 8/2012 | Bunker | |
| 2012/0243995 A1 | 9/2012 | Bunker et al. | |
| 2012/0255870 A1 | 10/2012 | Rebak et al. | |
| 2012/0276308 A1 | 11/2012 | Rebak et al. | |
| 2012/0328448 A1 | 12/2012 | Bunker | |
| 2013/0043009 A1 | 2/2013 | Bunker et al. | |
| 2013/0056184 A1 | 3/2013 | Bunker | |
| 2013/0078428 A1 | 3/2013 | Bunker | |
| 2013/0086784 A1 | 4/2013 | Bunker | |
| 2013/0101761 A1 | 4/2013 | Bunker et al. | |
| 2013/0156600 A1 | 6/2013 | Bunker | |
| 2013/0272850 A1 | 10/2013 | Bunker | |

OTHER PUBLICATIONS

Lambie et al., "An Overview on Micro-Meso Manufacturing Techniques for Micro-Heat Exchangers for Turbine Blade Cooling," International Journal Manufacturing Research, vol. 3, No. 1, 2008, pp. 3-26.

Bunker, "Components With Microchannel Cooled Platforms and Fillets and Methods of Manufacture", U.S. Appl. No. 13/478,517, filed May 23, 2012.

Bonini et al., "Methods of Forming Cooling Channels Using Backstrike Protection", U.S. Appl. No. 13/628,204, filed Sep. 27, 2012.

Butler et al., "Components With Asymmetric Cooling Channels and Methods of Manufacture", U.S. Appl. No. 131/664,458, filed Oct. 31, 2012.

* cited by examiner

COMPONENTS WITH MULTI-LAYERED COOLING FEATURES AND METHODS OF MANUFACTURE

BACKGROUND

The disclosure relates generally to gas turbine engines, and, more specifically, to micro-channel cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve an acceptably long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined and suitably cooled.

In all of these exemplary gas turbine engine components, thin walls of high strength superalloy metals are typically used to reduce component weight and minimize the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and any associated coatings. However, this cooling strategy typically results in comparatively inefficient heat transfer and non-uniform component temperature profiles.

Employing micro-channel cooling techniques has the potential to significantly reduce cooling requirements. Micro-channel cooling places the cooling as close as possible to the heat flux source, thus reducing the temperature difference between the hot side and cold side of the load bearing substrate material for a given heat transfer rate. However, current techniques provide for the forming of one or more grooves within a substrate layer with a subsequent application of one or more coating layers to bridge the one or more grooves and define the micro-channels. In many instances, forming the microchannels in the load bearing substrate layer requires intrusive machining into the substrate material, and weakening the substrate layer. In addition, geometry restricted regions may prevent the fabrication thereto of cooling flow channels.

It would therefore be desirable to provide a method for forming cooling flow channels in hot gas path components that provides for a more efficient and flexible cooling design that can be structured into complex or restricted geometries of real parts, while minimizing the number of channels machined intrusively into the substrate material.

BRIEF DESCRIPTION

One aspect of the present disclosure resides in a manufacturing method that includes providing a substrate with an outer surface and at least one interior space and having one or more grooves formed in a portion of the substrate; applying one or more coatings on at least a portion of the substrate; forming one or more grooves in each of the one or more coatings; applying a cover coating on at least a portion of an outermost surface of the one or more coatings; and forming one or more cooling outlets in the cover coating and in fluid communication with the one or more grooves formed in the one or more coatings. Each groove formed in the substrate extends at least partially along the substrate. Each groove formed in the one or more coatings extends at least partially along the one or more coatings and in fluid communication with the one or more grooves in the substrate. The substrate, the one or more coatings and the cover coating define therein a cooling network for cooling a component.

Another aspect of the present disclosure resides in a manufacturing method that includes providing a substrate with an outer surface and at least one interior space and having one or more grooves formed in a portion of the substrate; applying one or more coatings on at least a portion of the substrate to define at least one distribution header in the substrate; forming one or more grooves in each of the one or more coatings; applying a cover coating on at least a portion of an outermost surface of the one or more coatings; and forming one or more cooling outlets in the cover coating and in fluid communication with the one or more grooves formed in the one or more coatings. Each groove formed in the substrate extends at least partially along the substrate. Each groove formed in the one or more coatings extends at least partially along the one or more coatings and in fluid communication with the at least one distribution header in the substrate. The substrate, the one or more coatings and the cover coating define a cooling network defined by one or more cooling flow channels having portions formed in the substrate and in the one or more coatings for cooling a component.

Yet another aspect of the present disclosure resides in a component that includes a substrate, one more coating disposed on at least a portion of the substrate and a cover coating disposed over at least a portion of an outermost coating of the one or more coatings. The substrate comprising an outer surface and an inner surface, wherein the inner surface defines at least one interior space. The substrate including one or more grooves formed in a portion of the substrate, wherein each groove extends at least partially along the substrate. One or more cooling supply inlets are formed through a base of a respective groove in the substrate, to connect the groove in fluid communication with an interior space. The one or more coatings are disposed on at least a portion of the substrate. The one or more coatings define one or more grooves therein, wherein each groove extends at least partially along the outer surface of one of the one or more coatings. The cover coating is disposed over at least a portion of an outermost coating of the one or more coatings. One or more cooling outlets are formed through the cover coating, to connect the one or more grooves in the coatings to an exterior. The substrate, the one or more coatings and the cover coating together define a cooling network for cooling comprised of one or more cooling flow channels for cooling the component.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the cooling outlet" may include one or more cooling outlets, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

Figure 1:
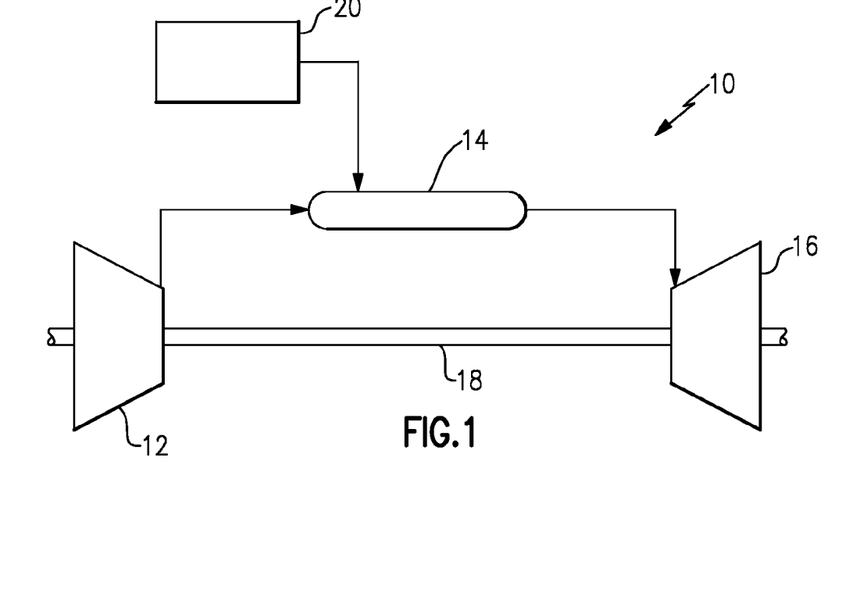
FIG. 1 is a schematic illustration of a gas turbine system according to one or more embodiments shown or described herein.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shafts 18. The shaft 18 may be a single shaft or multiple shaft segments coupled together to form shaft 18.

The gas turbine system 10 may include a number of hot gas path components. A hot gas path component is any component of the system 10 that is at least partially exposed to a flow of high temperature gas through the system 10. For example, bucket assemblies (also known as blades or blade assemblies), nozzle assemblies (also known as vanes or vane assemblies), shroud assemblies, transition pieces, retaining rings, and turbine exhaust components are all hot gas path components. However, it should be understood that the hot gas path component of the present disclosure is not limited to the above examples, but may be any component that is at least partially exposed to a flow of high temperature gas. Further, it should be understood that the hot gas path component of the present disclosure is not limited to components in gas turbine systems 10, but may be any piece of machinery or component thereof that may be exposed to high temperature flows.

When a hot gas path component is exposed to a hot gas flow, the hot gas path component is heated by the hot gas flow and may reach a temperature at which the hot gas path component is substantially degraded or fails. Thus, in order to allow system 10 to operate with hot gas flow at a high temperature, as required to achieve the desired efficiency, performance and/or life of the system 10, a cooling system for the hot gas path component is needed. These various hot gas components are typically made from various forms of superalloy metals, typically nickel or cobalt based for modern gas turbine engines. These hot components are typically hollow and provided with suitable cooling circuits therein that receive the pressurized cooling air flow from the compressor which is used as a coolant in reducing their temperatures during operation.

In general, the cooling system of the present disclosure includes a series of small channels, or micro-channels, formed in the substrate and a protective coating layer of the hot gas path component. The hot gas path component may include one or more grooves formed in the substrate and the one or more coatings to bridge there over the one or more in an adjacent layer, and form the micro-channels, also referred to herein as cooling flow channels. For industrial sized power generating turbine components, "small" or "micro" channel dimensions would encompass approximate depths and widths in the range of 0.25 mm to 1.5 mm, while for aviation sized turbine components channel dimensions would encompass approximate depths and widths in the range of 0.1 mm to 0.5 mm. A cooling fluid may be provided to the channels from a plenum, and the cooling fluid may flow through the channels, cooling the hot gas path component. In this way, the coolant flow is first used for impingement cooling an inner surface of the hot gas path component and then enters through one or more cooling supply inlets (described presently) for flow through the network of flow channels (described presently) prior to discharge from the one or more cooling outlets (described presently).

Figure 2:
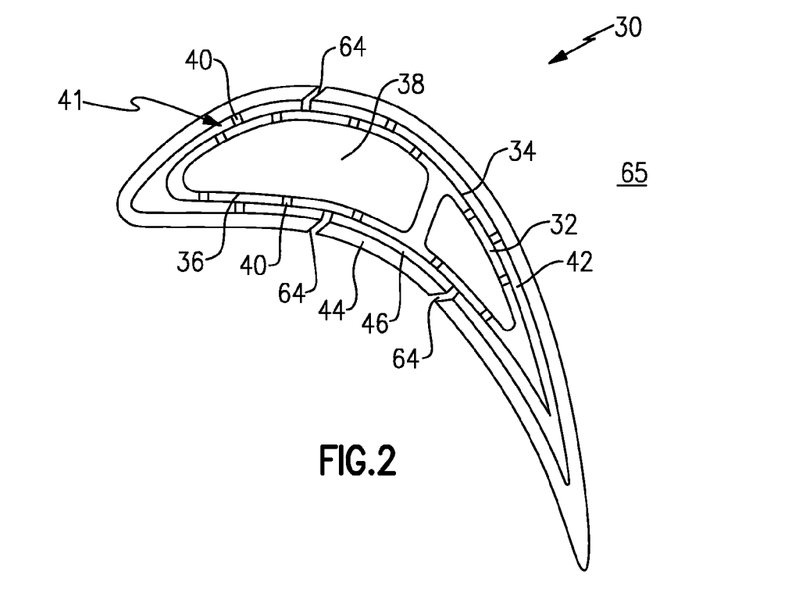
FIG. 2 is a schematic cross-section of an example airfoil configuration with cooling flow channels, according to one or more embodiments shown or described herein.

Referring now to FIG. 2, illustrated is an example of a hot gas component 30 having an airfoil configuration. As indicated, the component 30 comprises a substrate 32 with an outer surface 34 and an inner surface 36. Defined within the substrate 32 are portions of one or more cooling flow channels 40. The inner surface 36 of the substrate 32 defines at least one hollow, interior space 38. In an alternate embodiment, in lieu of a hollow interior space, the hot gas component 30 may include a supply cavity. One or more coatings 42 (of which only one is illustrated) are disposed over at least a portion of the outer surface 34 of the substrate 32. Defined within the one or more coatings 42 are portions of the one or more cooling flow channels 40. The portions of the one or more cooling flow channels 40 formed in the one or more coatings 42 are in fluid communication with the portions of the one or more cooling flow channels 40 formed in the substrate. A cover coating 44 is disposed over at least a portion of an outermost surface 46 of the one or more coatings 42. Defined within the cover coating 44 are the one or more cooling outlets 64 in fluid communication with the one or more cooling flow channels 40. Accordingly, each of the one or more cooling flow channels 40 extends at least partially within the substrate 32 and the one or more coatings 42 and is in fluidic communication with the at least one hollow, interior space 38 via the one or more cooling supply inlets (not shown) formed in the substrate 32 to an exterior 65, via the one or more cooling outlets 64.

In an embodiment, the cooling supply inlets (described presently) and the cooling flow outlets (described presently) are configured as discrete openings and do not run the length of the respective cooling flow channels 40. The one or more coatings 42 are disposed over at least a portion of the outer surface 34 of the substrate 32, having defined therein one or more grooves that in combination with an adjacent coating layer, of the one or more coatings 42, form a portion of the network of the cooling flow channels 40. In addition, the coating layers of the one or more coatings 42, disposed over at least a portion of the outer surface 34 of the substrate 32, have defined therein one or more grooves, that in combination with a disposed adjacent coating layer of the one or more coatings 42, or an adjacent cover coating 44 disposed overlying, form a portion of the network of cooling flow channels 40.

As described below, the method disclosed herein includes deposition and machining techniques to create a three-dimensional finished component 30, and more particularly the airfoil, including one or more cooling flow channels 40, wherein the substrate 32, the one or more coatings 42 and the cover coating 44 define therein a cooling network 41 for cooling the component 30. The method may result in a component 30 that includes near transpiration cooling without the necessity of using porous materials of diminished strength. The one or more cooling flow channels 40 may be arbitrary, or specifically targeted for location and size, and as such flexible in design. Re-entrant shaped cooling flow channels typically utilized to minimize deposition of the coating within the channel structure are not required, resulting in a decrease in machining time and relaxation of design tolerances. In addition, repair of the component 30 is easier, both in recovering mistakes on new part manufacture and in full repair.

As previously indicated, an exemplary embodiment fabricated according to the method disclosed herein is the fabrication of a gas turbine airfoil, including an interior hollow passageway in fluidic communication with one or more cooling flow channels formed within the substrate and two or more coatings disposed on the substrate of the component.

Illustrated in FIGS. 3-10, are various embodiments of a portion of a hot gas component, such as the hot gas component 30 of FIG. 2. In each of the illustrated embodiments, one or more coatings are illustrated as disposed on an outermost surface of the substrate, and having an additional cover coating disposed on an outermost surface of the one or more coatings. Formed within a portion of the substrate and the one or more coatings is a network or pattern of cooling flow channels.

Figure 3:
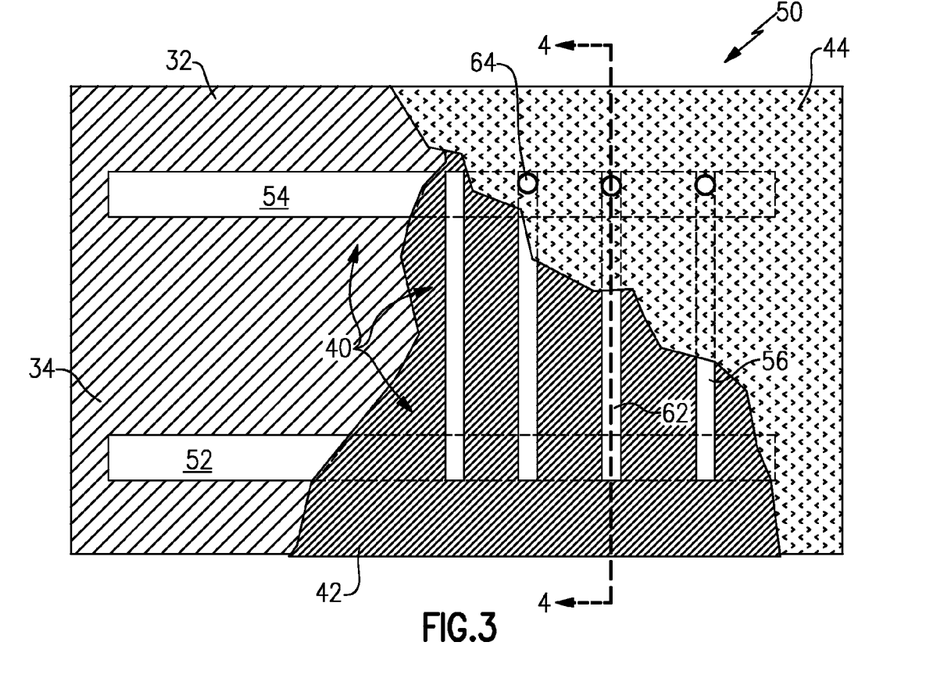
FIG. 3 schematically depicts, in a cut-away plan view, example cooling flow channels that extend partially along the surface of the substrate and within one or more coatings to respective cooling outlets formed in an outermost airfoil coating, according to one or more embodiments shown or described herein.
Figure 4:
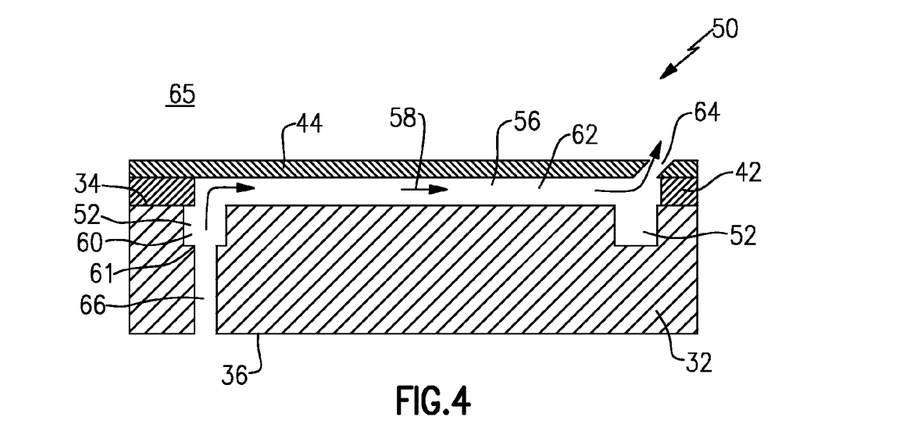
FIG. 4 is a cross-sectional view taken along line 4-4 of FIG. 3, illustrating one of the example cooling flow channels of FIG. 3 and shows the channel conveying coolant from an access hole to a cooling outlet according to one or more embodiments shown or described herein.

Referring more specifically to FIGS. 3 and 4, illustrated is a first embodiment of a portion of a hot gas path component 50, including a network or pattern of cooling flow channels 40, generally similar to cooling flow channels 40 of FIG. 2. In an embodiment, the network or pattern of cooling flow channels 40 is comprised of those dedicated as flow distribution headers, and more specifically inlet and outlet headers 52, 54, with the remaining flow channels 40 defining cross channels 56 extending between the headers 52, 54 for a carrying cooling flow 56 therebetween in parallel. For example, in the embodiment illustrated in FIG. 3 the cross channels 56 extend transversely between the inlet and outlet headers 52, 54. The cross channels 56 are preferably straight and extend directly from the inlet header 52 directly to the outlet header 54, and all operate in unison or parallel flow for channeling the coolant axially along hot gas component 50. As illustrated, the inlet and outlet headers 52, 54 are formed in the substrate 32 and the cross channels 56 are formed in the one or more coatings 42. At least a portion of an outer surface 34 of the substrate 32 has disposed thereon the one or more coatings 42. The one or more coatings 42 are suitably affixed or bonded thereto. In this particular illustrated embodiment, a single coating 42 is disposed on the outermost surface 34 of the substrate 32.

As indicated for example in FIG. 3, the manufacturing method includes forming one or more grooves 60 (which partially define a portion of the channels 40, and more specifically define the inlet, outlet headers 52, 54) in the outer surface 34 of the substrate 32. The substrate 32 may be formed in any conventional manner such as by casting or machining, with the one or more grooves 60 being suitably formed by casting or machining in the outer surface 34 of the substrate 32.

One or more cooling supply inlets 66 are provided to connect the one or more cooling flow channels 40, and more particularly the inlet headers 52, to the respective interior spaces 38. As shown in FIG. 2, the substrate 32 has at least one interior space 38. It should be noted that the cooling supply inlets 66, shown in FIG. 4, are discrete holes located in the cross-section shown and do not extend through the substrate 32 along the length of the one or more grooves inlet headers 52. The cooling supply inlets 66 may be machined anywhere and in any desired pattern connecting the one or more inlet headers 52 to the respective interior spaces 38. More particularly, the one or more cooling supply inlets 66 are formed through a base 61 of a respective groove 62 in the substrate 32. The cooling supply inlets 66 may be formed at normal angle relevant to the local surface, such as the inner surface 36 of the substrate 32, as best illustrated in FIG. 4, or at an acute angle (not shown) to the local surface, such as the inner surface 36 of the substrate 32. In an embodiment the cooling supply inlets 66 may be cast or machined through the substrate 32. The cooling supply inlets 66 are sized for metering and controlling the flowrate of the inlet coolant to the one or more cooling flow channels 40.

One or more coatings 42 are deposited on the outer surface 34 of the substrate 32. In an embodiment, subsequent to deposition, the one or more coatings 42 are heat treated. In an embodiment, the one or more coatings 42 are fabricated to a depth of approximately 0.75 millimeters, although it should be understood that the thickness of the one or more coatings 42 is design dependent and dictated by desired resulting cooling feature size. The manufacturing method includes forming one or more grooves 62 (which partially define the channels 40) in the one or more coatings 42 deposited on the outer surface 34 of the substrate 32. The one or more grooves 62 may be formed by machining to selectively remove portions of the one or more coatings 42 in one or more vertical and horizontal directions, without penetrating into the substrate 32. Patterns may be formed in any arbitrary geometry, including grid-like, straight grooves, curved grooves, or the like, as long as dimensional requirements are maintained. As indicated, for example, in FIG. 3, each groove 62 extends at least partially along the one or more coatings 42 in fluid communication with the inlet, outlet headers 52, 54. More particularly, each groove 62, and resulting cooling flow channel 40, extends transversely between the inlet header 52 and the outlet header 54.

A cover coating 44 is next deposited on the outermost surface 46 of the one or more coatings 42. In an embodiment, subsequent to deposition, the cover coating layer 44 is heat treated. In an embodiment, the cover coating layer 44 is fabricated to a depth of approximately 0.75 millimeters, although it should be understood that the thickness of the cover coating 44 is design dependent and dictated by desired resulting cooling feature size.

As best illustrated in FIG. 4, subsequent to the deposition of the cover coating 44 on the outermost surface 46 of the one or more coatings 42, to complete the cooling pattern, one or more cooling outlets 64 may be machined through the cover coating 44 (and any subsequently deposited coatings) in any locations and pattern desired as long as the one or more cooling outlets 64 provide fluid communication with the cooling pattern, and more particularly for the one or more cooling flow channels 40. The one or more cooling outlets 64 may be normal to a local surface, or angled (as best illustrated in FIG. 4), include shaping, etc. In an embodiment, as needed, one or more cooling outlets (not shown) may also be machined through the substrate 32 to communicate directly with the interior region 38 of the component 30. In an embodiment, the cooling outlets 64 are configured as cooling exit holes. It should be understood that the cooling outlets 64 can take on many alternate forms, including exit trenches that may connect the cooling outlets of several cooling flow channels. Exit trenches are described in commonly assigned U.S. Patent Publication No. 2011/0145371, R. Bunker et al., "Components with Cooling flow channels and Methods of Manufacture," which is incorporated by reference herein in its entirety.

Figure 5:
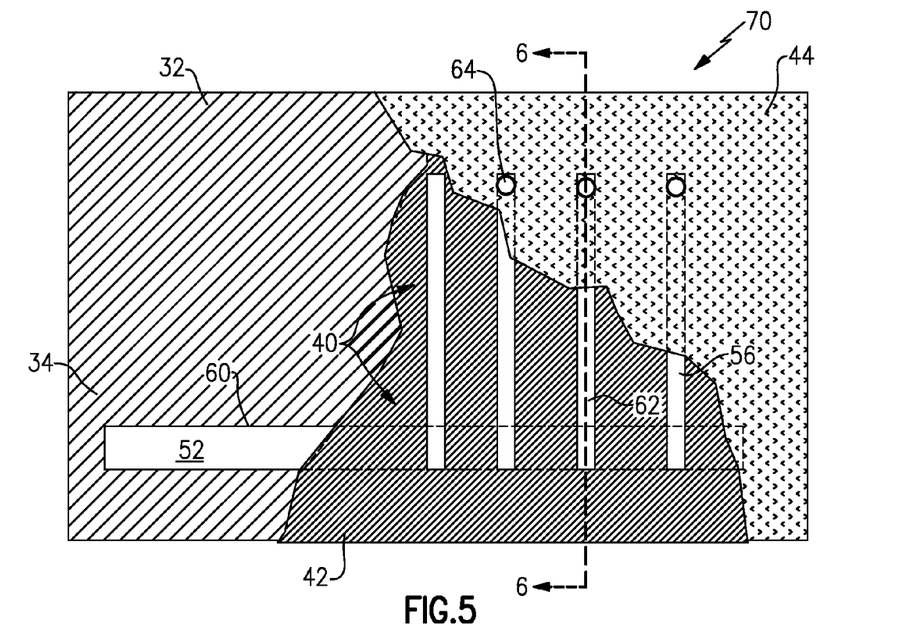
FIG. 5 schematically depicts, in a cut-away plan view, an alternate embodiment of example cooling flow channels that extend partially along the surface of the substrate and within one or more coatings to respective cooling outlets formed in an outermost airfoil coating, according to one or more embodiments shown or described herein.
Figure 6:
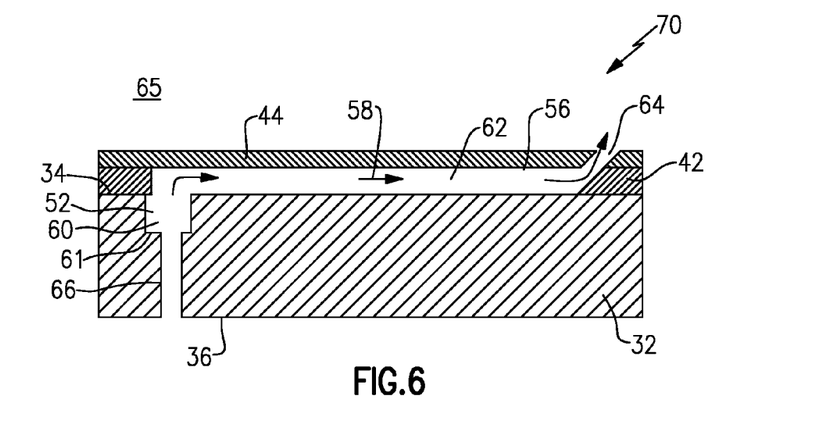
FIG. 6 is a cross-sectional view taken along line 6-6 of FIG. 5, illustrating one of the example cooling flow channels of FIG. 5 and shows the channel conveying coolant from an access hole to a cooling outlet according to one or more embodiments shown or described herein.

Referring now to FIGS. 5 and 6, illustrated is an alternate embodiment of a hot gas component 70, generally similar to components 30 and 50 of FIGS. 2-4, respectively. In this particular embodiment, the hot gas component 50 includes one or more cooling flow channels 40, defining an inlet header 52, an outlet header 54 and cross channels 56. In contrast to the previous embodiment, where outlet header 54 was formed in the substrate 32, in this particular embodiment, the outlet header 54 is defined within the one or more coatings 42. The remaining portions of the hot gas component 70 remain similarly defined to those previously described with regard to FIGS. 3 and 4. In this particular embodiment, by defining the outlet header 54 within the one or more coatings 42, the machining that must be intrusively performed into the substrate 32 is reduced, resulting in a more robust substrate.

Referring not to FIGS. 7-10, illustrated is an alternate embodiment of a hot gas component 80, generally similar to components 30, 50 and 70 of FIGS. 2-6, respectively. In this particular embodiment, the hot gas component 50 includes one or more cooling flow channels 40, defining an inlet header 52, an outlet header 54 defined within the one or more coatings 42 and one or more cross channels 56. In contrast to the previous embodiments, in this particular embodiment, the one or more cross-channels 56 are configured in generally a u-shaped, or serpentine, configuration axially between the inlet and outlet headers 52, 54 in adjacent coating layers 42, to form a stacked, continuous micro-cooling circuit 82 in the plurality of layers. In the exemplary illustrated configuration, the cross channels 56 define a u-shaped channel in adjacent layers of the one or more coatings 42, such as in the illustrated two coating layers 42.

Figure 7:
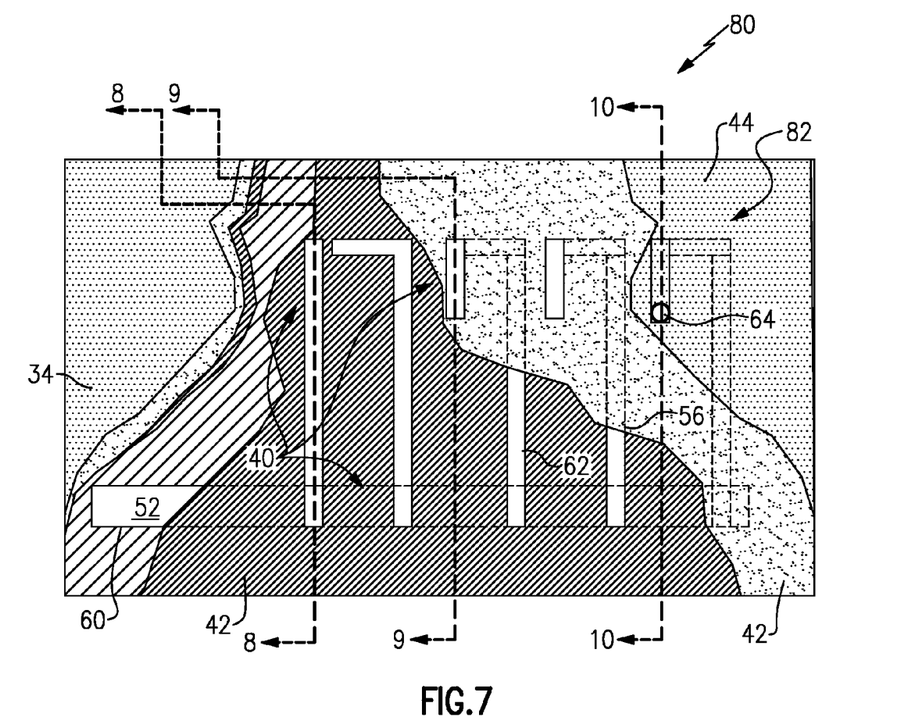
FIG. 7 schematically depicts, in a cut-away plan view, another alternate embodiment of example cooling flow channels that extend partially along the surface of the substrate and within one or more coatings to respective cooling outlets formed in an outermost airfoil coating, according to one or more embodiments shown or described herein.
Figure 8:
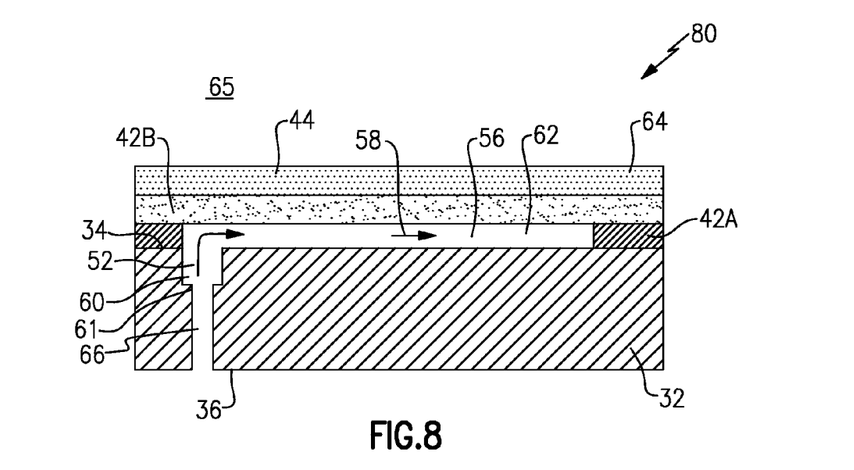
FIG. 8 is a cross-sectional view taken along line 8-8 of FIG. 7, illustrating a portion of one of the example cooling flow channels of FIG. 7 and shows the channel conveying coolant from an access hole through a portion of the cooling channel formed in a coating according to one or more embodiments shown or described herein.
Figure 9:
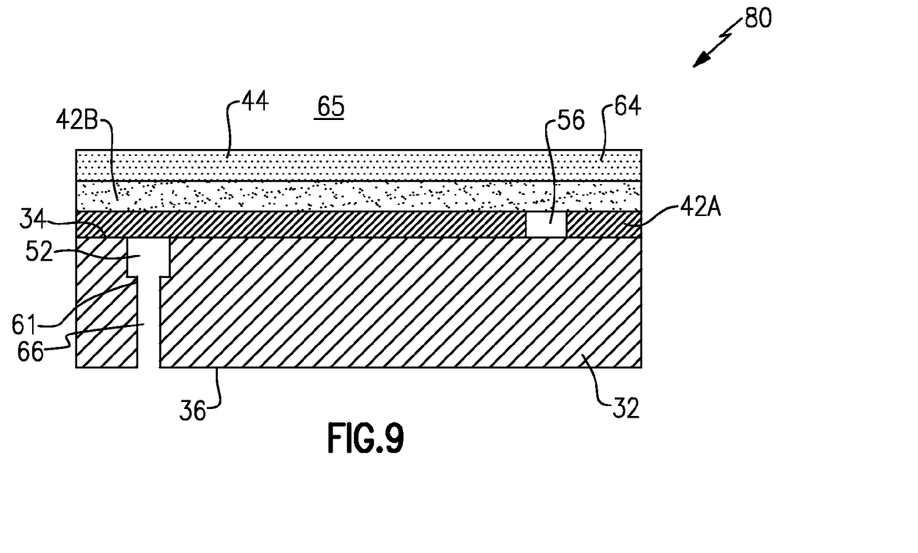
FIG. 9 is a cross-sectional view taken along line 9-9 of FIG. 7, illustrating a portion of one of the example cooling flow channels of FIG. 7 and shows the channel conveying coolant through a portion of the cooling channel formed in a coating according to one or more embodiments shown or described herein.
Figure 10:
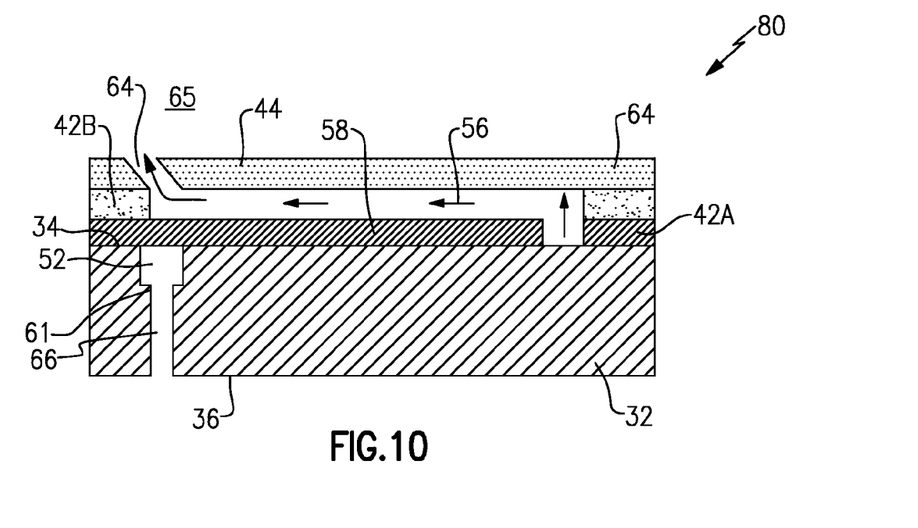
FIG. 10 is a cross-sectional view taken along line 10-10 of FIG. 7, illustrating a portion of one of the example cooling flow channels of FIG. 7 and shows the channel conveying coolant from a portion of the cooling channel formed in a coating to a cooling outlet according to one or more embodiments shown or described herein.

Referring more specifically to FIG. 8, illustrated in cross-sectional view taken along line 8-8 of FIG. 7, illustrated is the substrate 32 having defined therein one or more grooves 60 to form the inlet header 52 as previously described. The cross-channels 56 are formed in the one or more coatings 42, wherein a plurality of grooves 62 are formed in a first coating 42A of the one or more coatings 42 and a plurality grooves 62 are formed in a second adjacent coating 42B of the one or more coatings 42. As best illustrated in the cross-sectional view FIG. 9, taken along line 9-9 of FIG. 7, and the cross-sectional view FIG. 10, taken along line 10-10 of FIG. 7, the grooves 62 define the one or more cooling flow channels 40 in fluid communication as they progress through the stack of layers, comprised of the substrate 32, the one or more coatings 42 and the cover coating 44. The remaining portions of the hot gas component 70 remain similarly defined to those previously described with regard to FIGS. 3-6. In this particular embodiment, by defining the outlet header 54 within the one or more coatings 42 and the one or more cooling flow channels 40 as serpentine channels through multiple layers of the one or more coatings 42, the machining that must be intrusively performed into the substrate 32 is reduced, resulting in a more robust substrate and virtually any patterning of a stacked, continuous micro-cooling circuit is possible.

In the previously disclosed embodiments, the substrate 32 is typically a cast structure, as discussed in U.S. Pat. No. 5,626,462, Melvin R. Jackson et al., "Double-wall airfoil," which is incorporated herein in its entirety. The substrate 32 may be formed from any suitable material. Depending on the intended application for component 30, this could include Ni-base, Co-base and Fe-base superalloys. The Ni-base superalloys may be those containing both γ and ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high-temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4.5-10.5)Al-(4.5-7.9)Cr-(1.5-5.5)Hf-(0-6)V, where the composition ranges are in atom percent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and/or $Mo_3Si$ second phases. For other configurations, the substrate material comprises a ceramic matrix composite (CMC), such as a silicon carbide (SiC) matrix reinforced with SiC fibers. For other configurations the substrate material comprises a TiAl-based intermetallic compound.

The one or more coatings 42 and the cover coating 44 may be applied or deposited using a variety of techniques. For particular processes, the one or more coatings 42 and the cover coating 44 may be deposited by performing ion plasma deposition (also known in the art as cathodic arc deposition). Example ion plasma deposition apparatus and method are provided in commonly assigned, U.S. Pat. No. 7,879,203, Weaver et al., "Method and Apparatus for Cathodic Arc Ion Plasma Deposition," which is incorporated by reference herein in its entirety. Briefly, ion plasma deposition comprises placing a consumable cathode having a composition to produce the desired coating material within a vacuum chamber, providing the substrate within the vacuum environment, supplying a current to the cathode to form a cathodic arc upon a cathode surface resulting in arc-induced erosion of coating material from the cathode surface, and depositing the coating material from the cathode upon the outer surface of the substrate.

Non-limiting examples of a coating deposited using ion plasma deposition are described in U.S. Pat. No. 5,626,462. For certain hot gas path components, the coating comprises a nickel-based or cobalt-based alloy, and more particularly comprises a superalloy or a (Ni,Co)CrAlY alloy. Where the substrate material is a Ni-base superalloy containing both γ and γ' phases, coating may comprise similar compositions of materials, as discussed in U.S. Pat. No. 5,626,462. Additionally, for superalloys the coating may comprise compositions based on the γ'-$Ni_3Al$ family of alloys.

For other process configurations, the one or more coatings 42 and the cover coating 44 are deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also known as vacuum plasma spray or VPS). In one non-limiting example, a (Ni,Co)CrAlY coating is deposited by HVOF or HVAF. Other example techniques for depositing the coating 42 include, without limitation, sputtering, electron beam physical vapor deposition, entrapment plating, and electroplating.

The one or more cooling flow channels 40, and more specifically the one or more grooves 60, 62, may be configured having any of a number of different shapes. For the example configuration shown in FIGS. 3-10, the one or more cooling flow channels 40 are substantially rectangular in cross-section. Although shown as having straight walls, the one or more cooling flow channels 40 may have any wall configuration, for example, they may be straight or curved. The dimensions of the flow channels 40 in the disclosed embodiment may range from about 15 mils or 0.38 mm to about 60 mils or about 1.5 mm in square or rectangular profiles, although other geometric profiles are anticipated by this disclosure. The size of the one or more cooling flow channels 40 should be small enough to fit within the wall of the relatively thin substrate 32, and the one or more coatings 42. The one or more cooling flow channels 40 should be large enough to minimize dust accumulation therein during operation for preventing their premature clogging over extended life in dusty operating environments.

The one or more cooling flow channels 40, and more specifically the one or more grooves 60, 62, may be formed using a variety of techniques. Example techniques for forming the one or more grooves 60, 62 include an abrasive liquid jet, such as an abrasive water jet, plunge electrochemical machining (ECM), electric discharge machining (EDM) with a spinning electrode (milling EDM), and/or laser machining. Example laser machining techniques are described in commonly assigned, U.S. Publication No. 2011/0185572, B. Wei et al., "Process and System for Forming Shaped Air Holes", which is incorporated by reference herein in its entirety. Example EDM techniques are described in commonly assigned U.S. Patent Publication No. 2011/0293423, R. Bunker et al., "Articles Which Include Chevron Film Cooling Holes and Related Processes," which is incorporated by reference herein in its entirety.

For particular processes, the one or more grooves 60, 62, the cooling outlets 64 and the cooling supply inlets 66 are formed using an abrasive liquid jet. Example abrasive liquid jet drilling processes and systems are additionally provided in U.S. Publication No. 2011/0293423. As explained in U.S. Publication No. 2011/0293423, the abrasive liquid jet process typically utilizes a high-velocity stream of abrasive particles (e.g., abrasive "grit"), suspended in a stream of high pressure water. The pressure of the liquid may vary considerably, but is often in the range of about 35-620 MPa. A number of abrasive materials can be used, such as garnet, aluminum oxide, silicon carbide, and glass beads. Beneficially, the capability of abrasive liquid jet machining techniques facilitates the removal of material in stages to varying depths and with control over the shape of the machined features. This allows the one or more interior cooling supply inlets 66 that supply the one or more cooing channels 40 to be drilled either as a straight hole of constant cross section, a shaped hole (e.g., elliptical), or a converging or diverging hole (not shown).

In addition, and as explained in U.S. Publication No. 2011/0293423, the water jet system may include a multi-axis computer numerically controlled (CNC) unit (not shown). The CNC systems themselves are known in the art, and described, for example, in U.S. Pat. No. 7,351,290, S. Rutkowski et al., "Robotic Pen", which is incorporated herein by reference in its entirety. CNC systems allow movement of the cutting tool along a number of X, Y, and Z axes, as well as the tilt axes.

As previously indicated, the manufacturing method may further optionally include preheating the substrate 32 prior to or during the deposition of the one or more coatings 42. Further, the manufacturing method may further optionally include heat treating (for example vacuum heat treating at 1100° C. for two hours) the component 30, 50, 70, 80 after the one or more coatings 42 have been deposited. These heat treating options may improve the adhesion of the one or more coatings 42 to the substrate 32 and/or increase the ductility of the one or more coatings 42. In addition, the manufacturing method may further optionally include performing one or more grit blast operations. For example, the outer surface 34 of the substrate 32 may optionally be grit blast prior to applying the one or more coatings 42. In addition, the outermost surface 46 of the one or more coatings 42 may optionally be subjected to a grit blast, so as to improve the adherence of the subsequently deposited cover coating 44. Grit blast operations would typically be performed after heat treatment, rather than immediately prior to heat treatment.

As indicated, for example, in FIGS. 3-10, the manufacturing method further includes disposing the cover coating 44 over at least a portion of the outermost surface 46 of the one or more coatings 42 to provide bridging of the grooves 62 formed in the outermost layer or surface 46 of the one or more coatings 42. It should be noted that this cover coating 44 may comprise one or more different coating layers. For example, the cover coating 44 may include a cover coating and/or optional additional coating layer(s), such as bond coatings, thermal barrier coatings (TBCs) and oxidation-resistant coatings. For particular configurations, the cover coating 44 comprises an outer coating layer. As indicated, for example, in FIGS. 3-10, the substrate 32, the one or more coatings 42 and the cover coating 44 define a network of cooling flow channels 40, including cooling outlets 64 and cooling supply inlets 66, for cooling the component.

For particular configurations, the one or more coatings 42 and the outer cover coating 44 have a combined thickness in the range of 0.1-2.0 millimeters, and more particularly, in the range of 0.2 to 1 millimeter, and still more particularly 0.2 to 0.5 millimeters for industrial components. For aviation components, this range is typically 0.1 to 0.25 millimeters. However, other thicknesses may be utilized depending on the requirements for a particular component 30.

The outer cover coating 44 may be deposited using a variety of techniques. Example deposition techniques for forming coatings are provided above. In addition to the cover coating, bond coatings, TBCs and oxidation-resistant coatings may also be deposited using the above-noted techniques.

For certain configurations, it is desirable to employ multiple deposition techniques for depositing the one or more coating 42 and the outer cover coating 44. For example, a first coating 42 may be deposited using an ion plasma deposition, and a subsequently deposited additional coatings 42 or cover coating 44 may be deposited using other techniques, such as a combustion thermal spray process or a plasma spray process. Depending on the materials used, the use of different deposition techniques for the one or more coatings 42 and the cover coating 44 may provide benefits in properties, such as, but not restricted to: strain tolerance, strength, adhesion, and/or ductility.

As previously indicated, the substrate 32 further includes one or more cooling supply inlets 66 extending transversely or radially therethrough beginning from the inner surface 36. A plurality of cooling outlets 64 extend transversely or radially through the cover coating 44. The cooling supply inlets 66 and cooling outlets 64 are disposed in flow communication with the network of flow channels 40 for delivering a cooling flow 58 thereto and discharging the cooling flow 58 therefrom.

Figure 11:
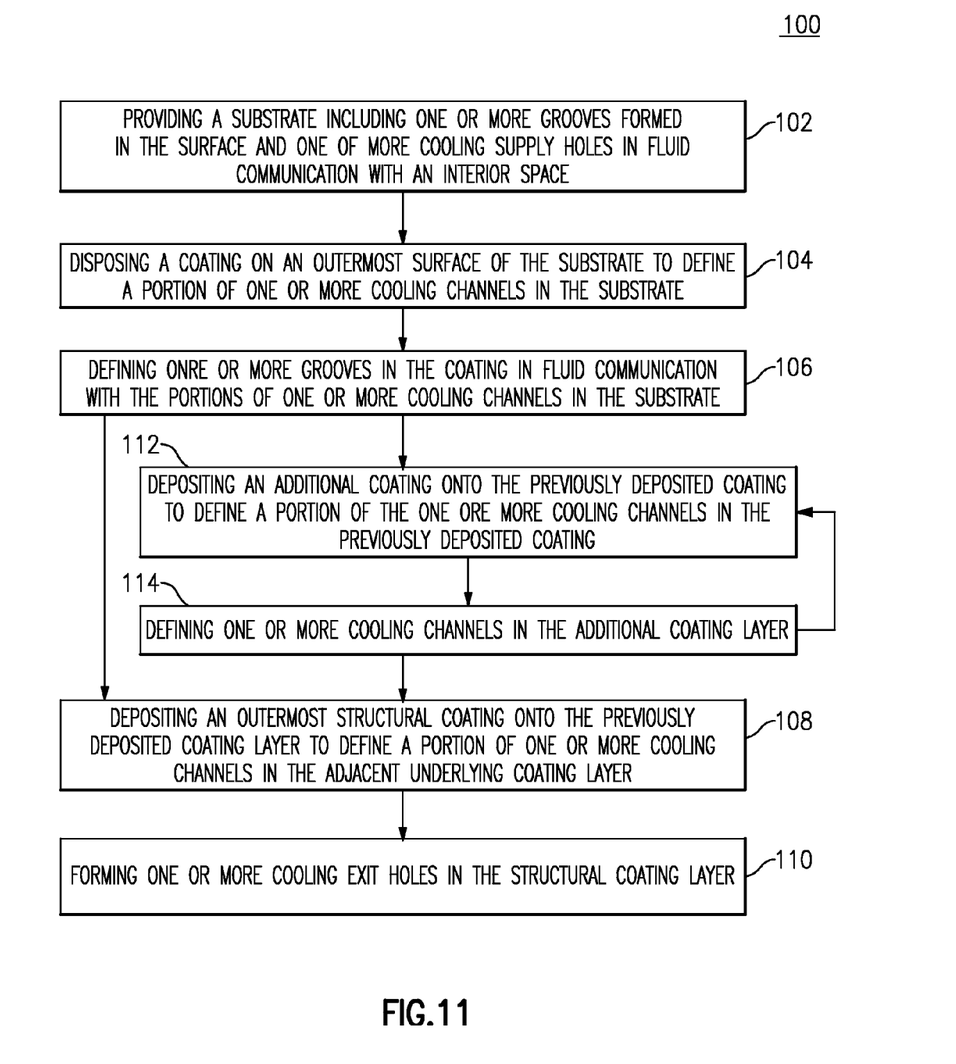
FIG. 11 is a flow chart depicting one implementation of a method of making a component including cooling flow channels according to one or more embodiments shown or described herein.

Referring now to FIG. 11, illustrated is a flow chart depicting one implementation of a method 100 of making a component 30, 50, 70, 80 including one or more cooling flow channels 40 according to one or more embodiments shown or described herein. The method 100 includes manufacturing the component 30, 50, 70, 80 to ultimately include one or more cooling flow channels 40 by initially providing a substrate 32 including one or more grooves 60 formed in an outermost surface 34, at step 102. A coating 42 is depositing on the outermost surface 34 of the substrate 32, at step 104. The coating 42 may optionally be heat treated prior to further processing steps. The coating 42 seals the one or more grooves 60 formed in the substrate 32 and defines a portion of the one or more cooling flow channels 40, and more particularly the inlet header 52, and optionally the outlet header 54, in the substrate 32. Next, at step 106, the coating 42 is machined to selectively remove the coating 42 in one or more vertical and horizontal directions, to define one or more grooves 62, into the coating 42 without penetrating into the substrate 32. The machining of patterns may be configured in any arbitrary geometry, including a curved geometry, as long as dimensional requirements are maintained. Next, at step 108, an outermost cover coating 44 is deposited onto the previously deposited coating layer 42 to define a portion of one or more cooling flow channels 40, and more particularly the one or more cross-channels 56 and optionally the outlet header 54, in the adjacent underlying coating 42.

Finally, in a step 110, one or more cooling outlets 64 are machined in the outermost cover coating 44. The one or more cooling outlets 64 are machined in any locations and pattern in the outermost cover coating 44 to provide fluid communication with the cooling pattern.

In an alternate embodiment, prior to deposition of the outermost cover coating 44 in step 108, additional coatings 42 may be deposited, at step 112. One or more grooves 62 are formed in the coatings 42, with subsequent depositions of coatings 42 defining the one or more cooling flow channels 40 therein, at a step 114. The deposition of coatings 42 may be repeated and grooves 62 formed therein, until the desired cooling network is achieved. The outermost cover coating 44, as previously described, is next deposited and the cooling outlets 64 formed therein.

After processing, provided is the component 30, 50, 70, 80 including the interior space passageway 38, the one or more cooling supply inlets 66 in fluidic communication with the interior passageway 38 and one or more cooling flow channels 40 formed in the substrate 32 and the one or more coatings 42 and in fluidic communication with the one or more cooling supply outlets 64 formed in the cover coating 44.

Beneficially, the above described manufacturing methods provide for a reduction in the number of micro-channels that are machined into the substrate of a component and provide that only those flow channels required to act as flow headers for the network of cooling flow channels, be formed in the substrate for feeding the remaining portions of flow channels formed in one or more coatings. By layering the cooling flow channels in at least two layers of material (the substrate and the one or more coatings), a true micro cooling circuit can be designed in the skin of the component. As previously described, in an embodiment, it is possible to eliminate the outlet header at the end point of the one or more cooling flow channels formed in the coating by allowing the cooling flow discharge to be either a set of discrete cooling exit holes, or a shallow trench, with the discharge being fed only by the one or more cooling flow channels formed in the coatings.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. This written description uses examples to disclose the disclosure, including the best mode, and also to enable any person skilled in the art to practice the disclosure, including making and using any devices or systems and performing any incorporated methods. The representative examples and embodiments provided herein include features that may be combined with one another and with the features of other disclosed embodiments or examples to form additional embodiments that are still within the scope of the present disclosure. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal languages of the claims.

The invention claimed is:

1. A manufacturing method comprising:
providing a substrate with an outer surface and at least one interior space and having one or more grooves formed in a portion of the substrate, wherein each groove extends at least partially along the substrate;
applying two or more coatings on at least a portion of the substrate;
forming one or more grooves in each of the two or more coatings, wherein each groove extends at least partially along a respective coating of the two or more coatings and wherein the one or more grooves in the two or more coatings are in fluid communication with one another and with the one or more grooves in the substrate;
applying a cover coating on at least a portion of an outermost surface of the two or more coatings; and
forming one or more cooling outlets in the cover coating and in fluid communication with the one or more grooves formed in each of the two or more coatings, wherein the substrate, the two or more coatings and the cover coating define therein a cooling network for cooling a component.

2. The manufacturing method of claim 1, wherein each of the one or more grooves in each of the two or more coatings is formed using one or more of an abrasive liquid jet, plunge electrochemical machining (ECM), electric discharge machining (EDM) with a spinning electrode (milling EDM), and laser machining.

3. The manufacturing method of claim 1, wherein the cooling network is defined by one or more cooling flow channels having portions formed in the substrate and in the two or more coatings.

4. The manufacturing method of claim 3, wherein the cooling network includes one or more cross-channels defined in the two or more coatings.

5. The manufacturing method of claim 3, wherein the cooling network includes one or more serpentine cooling flow channels defined in the two or more coatings.

6. The manufacturing method of claim 3, wherein the cooling network includes one or more u-shaped cooling flow channels defined in the two or more coatings.

7. The manufacturing method of claim 3, wherein the cooling network includes one or more distribution headers defined in the substrate.

8. The manufacturing method of claim 7, wherein the one or more distribution headers comprise an inlet header.

9. The manufacture method of claim 8, wherein the one or more distribution headers further comprise an outlet header.

10. A manufacturing method comprising:
providing a substrate with an outer surface and at least one interior space and having one or more grooves formed in a portion of the substrate, wherein each groove extends at least partially along the substrate;
applying two or more coatings on at least a portion of the substrate to define at least one distribution header in the substrate;
forming one or more grooves in each of the two or more coatings, wherein each groove extends at least partially along a respective coating of the two or more coatings and wherein the one or more grooves in the two or more coatings are in fluid communication with one another and with the at least one distribution header in the substrate;
applying a cover coating on at least a portion of an outermost surface of the two or more coatings; and
forming one or more cooling outlets in the cover coating and in fluid communication with the one or more grooves formed in each of the two or more coatings, wherein the substrate, the two or more coatings and the cover coating define a cooling network defined by one or more cooling flow channels having portions formed in the substrate and in the two or more coatings for cooling a component.

11. The manufacturing method of claim 10, wherein the cooling network includes one or more cross-channels defined in the two or more coatings.

12. The manufacturing method of claim 10, wherein the cooling network includes an inlet header and an outlet header defined in the substrate.

13. The manufacturing method of claim 12, wherein the cooling network includes one or more cross-channels defined in the two or more coatings and extending transversely between the inlet header and the outlet header.

14. The manufacturing method of claim 10, wherein the cooling network includes one or more serpentine cooling flow channels defined in the two or more coatings.

15. The manufacturing method of claim 10, wherein the cooling network includes one or more u-shaped cooling flow channels defined in the two or more coatings.

16. A component comprising
a substrate comprising an outer surface and an inner surface, wherein the inner surface defines at least one interior space, the substrate including one or more grooves formed in a portion of the substrate, wherein each groove extends at least partially along the substrate and wherein one or more cooling supply inlets are formed through a base of a respective groove in the substrate, to connect the groove in fluid communication with an interior space;
two or more coatings disposed on at least a portion of the substrate, wherein each of the two or more coatings define one or more grooves therein, wherein each groove extends at least partially along a respective coating of the two or more coatings and wherein the one or more grooves in the two or more coatings are in fluid communication with one another and with the one or more grooves in the substrate; and
a cover coating disposed over at least a portion of an outermost coating of the two or more coatings and wherein one or more cooling outlets are formed through the cover coating, to connect the one or more grooves in each of the two or more coatings to an exterior, wherein the substrate, the two or more coatings and the cover coating together define a cooling network for cooling comprised of one or more cooling flow channels for cooling the component.

17. The component of claim 16, wherein the cooling network includes one or more cross-channels defined in the two or more coatings.

18. The component of claim 16, wherein the cooling network includes one or more serpentine cooling flow channels defined in the two or more coatings.

19. The component of claim 16, wherein the cooling network includes one or more u-shaped cooling flow channels defined in the two or more coatings.

20. The component of claim 16, wherein the cooling network includes one or more distribution headers defined in the substrate.

* * * * *

UNITED STATES PATENT AND TRADEMARK OFFICE
CERTIFICATE OF CORRECTION

PATENT NO. : 9,476,306 B2  Page 1 of 1
APPLICATION NO. : 14/089888
DATED : October 25, 2016
INVENTOR(S) : Bunker It is certified that error appears in the above-identified patent and that said Letters Patent is hereby corrected as shown below:

In the Drawings

Fig. 11, drawing Sheet 6 of 6, in Step "102", in Line 2, delete "OF" and insert -- OR --, therefor.

Fig. 11, drawing Sheet 6 of 6, in Step "106", in Line 1, delete "ONRE" and insert -- ONE --, therefor.

Fig. 11, drawing Sheet 6 of 6, in Step "112", in Line 2, delete "ORE" and insert -- OR --, therefor.

In the Specification

Column 8, Line 42, delete "not" and insert -- now --, therefor.

Column 10, Line 56, delete "machining" and insert -- machining. --, therefor.

Column 10, Line 63, delete "Holes" and insert -- Holes, --, therefor.

In the Claims

Column 14, Line 33, Claim 9, delete "manufacture" and insert -- manufacturing --, therefor.

Signed and Sealed this
Sixth Day of June, 2017

Michelle K. Lee
*Director of the United States Patent and Trademark Office*